United States Patent [19]

Descovich et al.

[11] 4,153,662
[45] May 8, 1979

[54] METHOD AND APPARATUS FOR FORMING A JEWELRY NEST

[75] Inventors: Theodore Descovich, Mahwah; Louis F. Donadio, Ringwood, both of N.J.; Anthony F. Cecere, Hicksville, N.Y.

[73] Assignee: Avon Products, Inc., New York, N.Y.

[21] Appl. No.: 703,908

[22] Filed: Jul. 9, 1976

[51] Int. Cl.² .................. B29C 5/00; B29C 24/00
[52] U.S. Cl. .................... 264/227; 264/293; 264/296; 264/347
[58] Field of Search ............. 264/DIG. 44, 219, 225, 264/227, 321, 226, 293, 296, 347; 206/566, 592, 581, 591, 523; 425/405, 442, 342, 801, DIG. 44

[56] References Cited

U.S. PATENT DOCUMENTS

| | | | |
|---|---|---|---|
| 2,228,493 | 1/1941 | Will | 206/523 |
| 2,834,052 | 5/1958 | Hunn | 264/227 |
| 3,286,834 | 11/1966 | English | 206/523 |
| 3,459,847 | 8/1969 | Steptoe et al. | 264/227 |
| 3,549,744 | 12/1970 | Compton | 264/337 |
| 3,792,147 | 2/1974 | Wohlfarth et al. | 264/225 |
| 3,850,559 | 11/1974 | Mintz | 425/DIG. 44 |
| 3,917,786 | 11/1975 | Weigert | 264/227 |
| 3,990,115 | 11/1976 | Mako et al. | 206/523 |

Primary Examiner—W. E. Hoag
Attorney, Agent, or Firm—Pennie & Edmonds

[57] ABSTRACT

A method of and apparatus for replicating nest members, each of which has a precisely formed nest cavity for the snug yet removable receipt of an article of jewelry or the like. The method comprises impressing a master pattern having a configuration conforming to the jewelry article to be ultimately held by the nest member into a body of a curable material to form a cavity having a contour which corresponds to the nest cavity of the nest member. The body is cured to a hardened state and then placed on an unvulcanized first rubber mold member so that the impression is directed toward the mold member. The mold member is vulcanized so that a surface thereof takes a configuration which is complementary to that of the impression in the body. Thereafter, a jewelry nest member is cast in a mold comprised of the mold member and a second cooperating mold member, also of rubber. The finished jewelry nest member, therefore, will have a surface cavity whose configuration is precisely that of the nest cavity desired to be formed. The apparatus provides for the precise formation of the impression in the body.

3 Claims, 7 Drawing Figures

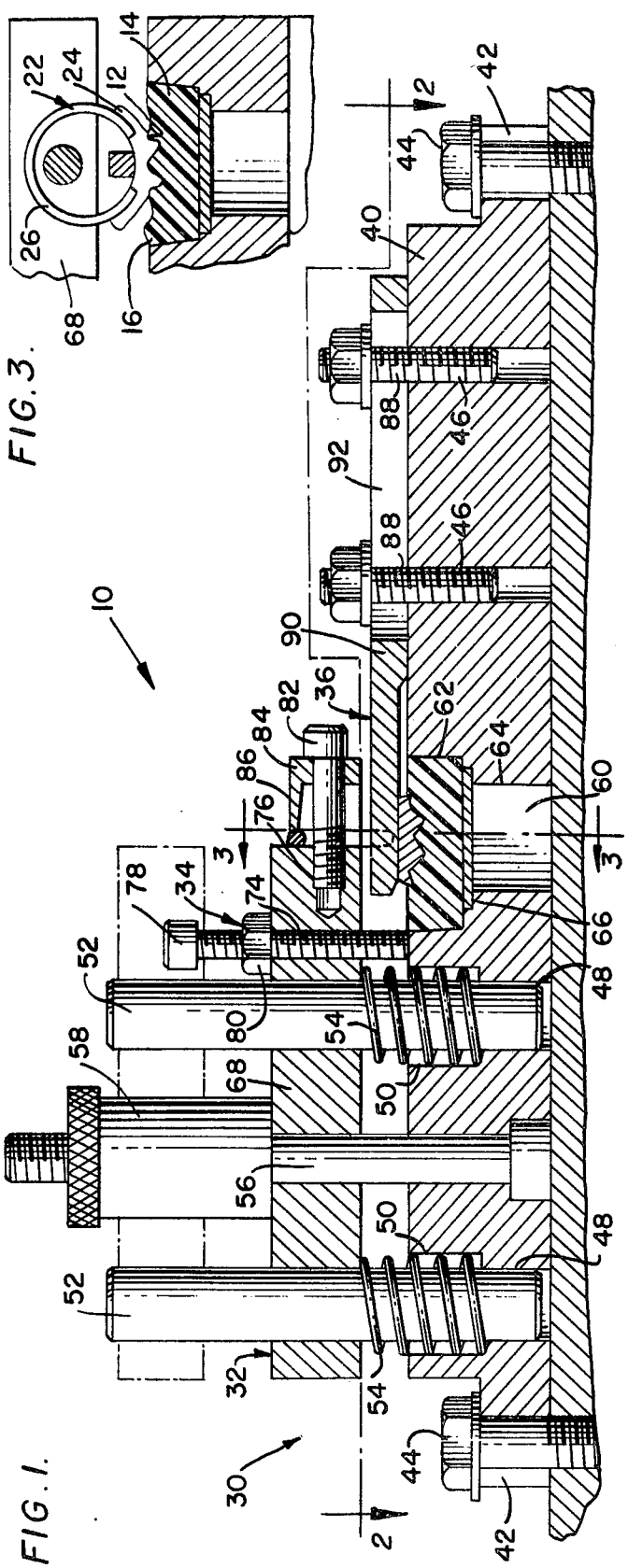
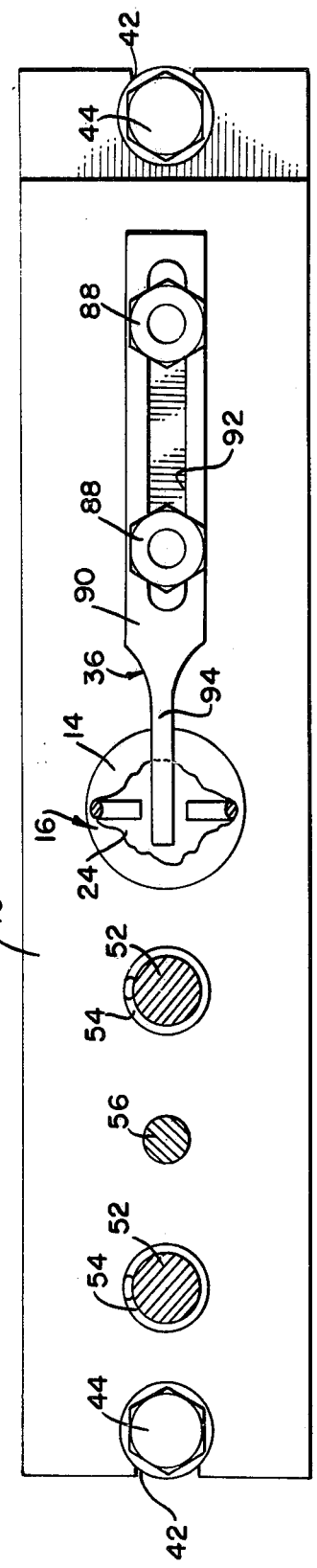

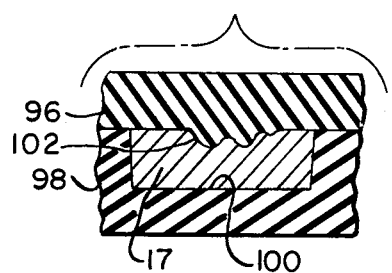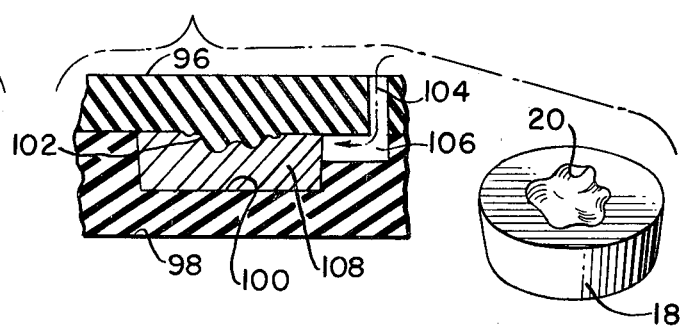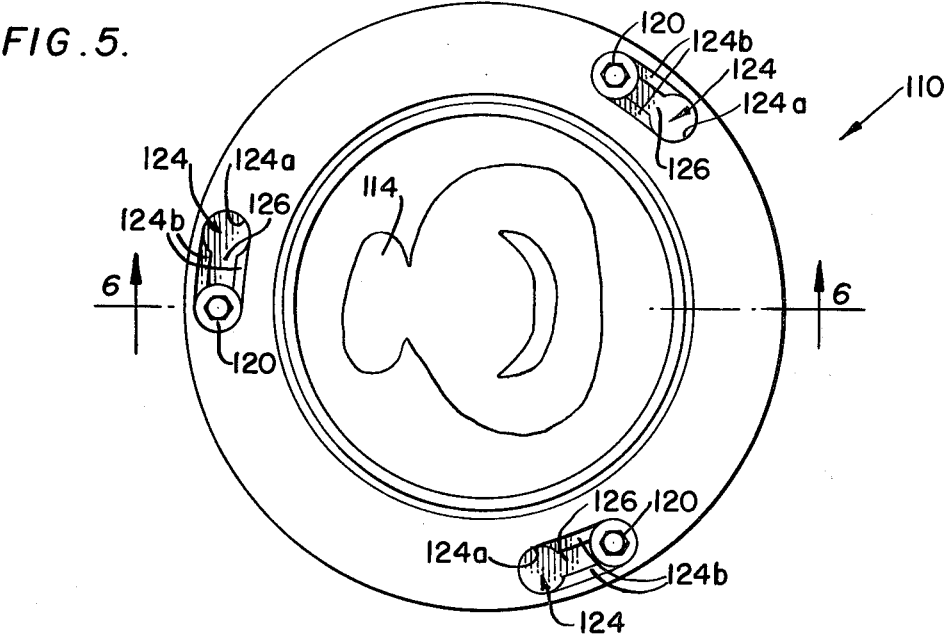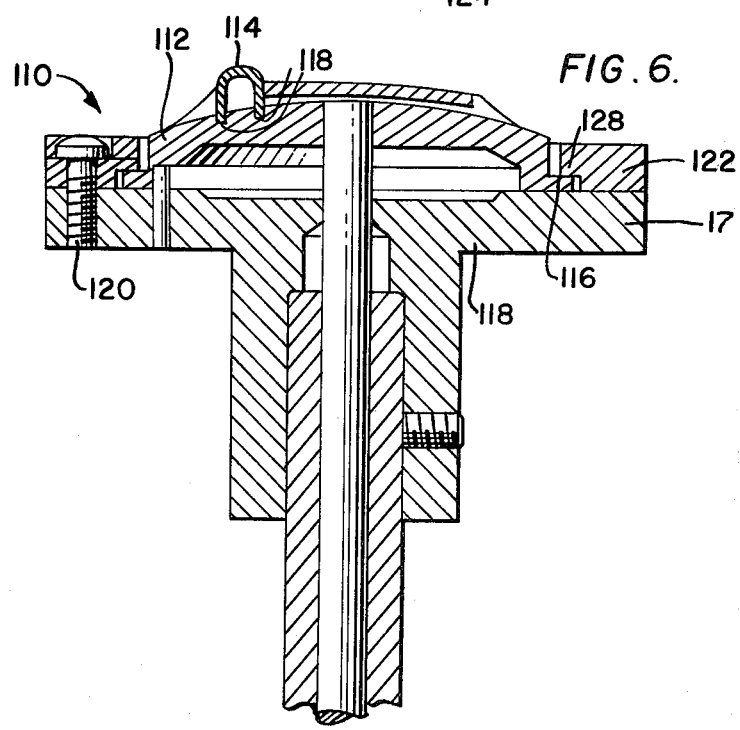

METHOD AND APPARATUS FOR FORMING A JEWELRY NEST

BACKGROUND OF THE INVENTION

1. Field of the Invention

The present invention relates, in general, to a method and apparatus for producing work holding members. More particularly, it pertains to a novel and improved method and apparatus for manufacturing unique and precisely formed work holding nests that are especially suitable for maintaining articles of jewelry or the like in a substantially stationary condition so that the latter can be conveniently worked upon.

2. Description of the Prior Art

In the field of jewelry making, it is a highly desirable practice to maintain various jewelry articles which are to be worked upon in a proper and stationary position for various work forming operations to be performed thereon. Heretofore known approaches for accomplishing such include work holding jewelry nests which have been used in such applications as electrochemical deburring and jewelry polishing. Typically, these known kinds of jewelry nests are formed primarily manually. It will, of course, be recognized that, as a result of this manual process, it is extremely difficult to obtain a cavity pattern formed in such work holding jewelry nest members which corresponds to the configuration of the individual pieces of jewelry which are to be received by the nest. Of course, this generally manual approach towards producing work holding jewelry nest members for jewelry items not only fails to provide a process which leads to the manufacture of such nests with precisely formed cavities, but also is unable to facilitate the formation of a plurality of nest members having nest cavities which are identically precisely formed.

With imprecisely formed cavities there are presented substantial defects since nest cavities not having a preciseness in configuration have wide variations between the formed mold cavity and the jewelry item to be held. Consequently, such condition makes it virtually impossible to freely secure a jewelry item in such nest member. Accordingly, during subsequent jewelry working operations, there would exist a significant tendency for the jewelry items to drift or to become misaligned relative to the nest. The attendant drawbacks associated with this misalignment can be appreciated whenever the jewelry nests would be used in devices wherein the jewelry items would have to remain substantially stationary as they are advanced to a plurality of work forming positions, whereby the accurate positioning of these items is necessary for the proper working operation to be performed thereon. As a consequence thereof, such tendency for having the jewelry item drift or become misaligned will render the jewelry nest member ineffective for purposes of performing its intended function.

From the preceding considerations, it will be apparent that heretofore known jewelry type work holding nests as well as the techniques for forming such nest members have been ineffective in forming members having cavities with precisely formed cavities which are identiccal to the configuration of the jewelry items which are to be carried thereby, much less effectively enable the formation of a multitude of jewelry nest members, each of which has a precisely formed nest cavity that virtually minimizes or eliminates any tendency for the jewelry item to drift or become misaligned during subsequent jewelry working operations.

SUMMARY OF THE INVENTION

Briefly stated, it is an object of the present invention to overcome the aforenoted shortcomings associated with present-day techniques for forming jewelry nest members by providing a novel and improved method and apparatus for rapidly, reliably and economically producing a plurality of jewelry nest members, wherein each nest member has a precisely formed nest cavity that is adapted to snugly and removably receive therein articles of jewelry or the like.

Essentially, as hereinafter set forth, the method envisioned by the present invention includes the steps of impressing a master pattern having a configuration conforming to the jewelry article or item to be held by the finished cast nest member into a body member formed of a curable material to thereby form an impression in the body having a contour corresponding to the nest cavity, curing the body so that the material thereof is hardened, placing the cured body on an unvulcanized first rubber mold member so that the impression faces the mold member, at least vulcanizing the first mold member so that a surface thereof is formed with a configuration which is complementary to that of the nest cavity, and thereafter casting the finished nest member in a mold comprising the first rubber mold member in conjunction with a second cooperating rubber mold member, such that the casting of the nest member has a surface which has the desired nest cavity configuration formed therein by virtue of being adjacent the complementary nest cavity surface on the first rubber mold member.

In connection with the novel and improved apparatus of this invention, such comprises stationary supporting means including a material receiving recess for receiving the material which is to be impressed by a master ring pattern which forms a corresponding cavity for the jewelry nest member; carrying means movably supported by the supporting means for enabling moving the master ring pattern between first and second positions, such that whenever the master ring pattern is in the second position, the pattern impresses the material to correspondingly form an initial cavity which is complementary to the pattern that is impressed therein; adjustable stop means operatively associated with the carrying means for contacting the supporting means to positively and accurately stop the carrying means in the second position; movable retaining means operatively connected to the supporting means for contacting the master ring pattern so as to prevent the pattern from upwardly moving whenever in the second position to thereby firmly retain the pattern in the material; and adjustable locking means cooperating with the carrying means for locking the ring pattern in position to thereby prevent its lateral displacement.

BRIEF DESCRIPTION OF THE DRAWINGS

The above, as well as other objects, features and advantages of the present invention, will become readily apparent upon a reading of a detailed description thereof when viewed in conjunction with the accompanying drawings wherein like reference numerals indicate like structure throughout the several views.

FIG. 1 is a cross-sectional side view of an apparatus, embodying the principles of the present invention, which is particularly adapted for use in forming jewelry nest members;

FIG. 2 is a plan view taken substantially along the line 2—2 appearing in FIG. 1 looking in the direction of the arrows and illustrating the apparatus as shown in FIG. 1;

FIG. 3 is an enlarged fragmentary view taken substantially along section line 3—3 appearing in FIG. 1 illustrating the cooperation between a master ring pattern and a curable and impressionable plastic material;

FIG. 4A is a fragmentary view illustrating the cooperation between cured plastic material having the cavity formed by the master pattern and a rubber mold member after vulcanization;

FIG. 4B is a fragmentary view which illustrates a casting step embodied by a preferred method of this invention depicting the manner by which a castable ring nest member is formed between two rubber mold discs;

FIG. 5 is a plan view showing a holding device for use in releasably retaining a nest member therein; and FIG. 6 is a cross-sectional side view taken substantially along the line 6—6 looking in the direction of the arrows showing a nest member held thereby.

DETAILED DESCRIPTION

Referring now to the drawings, and, in particular, to FIGS. 1 and 3, there is depicted a molding apparatus made in accordance with the principles of the present invention and being designated by reference numeral 10. Such molding apparatus 10, as hereinafter described, is essentially for purposes of forming an initial cavity 12 in a curable, plastic material 14 capable of retaining an impression of a master pattern 16. The material 14 may be manufactured from any suitable type which will be soft enough to permit the master pattern 16 to form cavity 12 and yet be curable so that it becomes hard enough to form a molded slug member 17 which retains the molded contour of cavity 12. Such a material may be an epoxy plastic type. It will be appreciated that jewelry pattern 16 may have any suitable configuration so long as it is identical to the contour configuration of the jewelry item which is to be subsequently snugly and removably received by a jewelry nest member 18 (FIG. 4B). It should be emphasized that the formation of cavity 12 is critical from the standpoint of having the subsequently formed jewelry nest member 18 with a cavity 20 configuration which is identical to that of the jewelry it is to hold. In this manner, it serves to substantially eliminate or prevent shifting, wandering or misalignment of a jewelry item held thereby.

In the illustrated embodiment, the master pattern is defined by a ring 22 having a setting portion 24 and a corresponding shank 26. The setting portion 24, of course, has a configuration substantially identical to that of the type of jewelry item which the nest member 18 is designed to snugly hold. Although the master ring pattern is being disclosed for use in the instant embodiment, it will be understood, of course, that other forms of nest members and ring patterns are contemplated for use by the present invention. As will be afterwards made more evident, molding apparatus 10 serves to ensure that the master pattern 16 will impress in material 14 in such a fashion that the resulting initial cavity 12 has a substantially complementary surface to the configuration on the master pattern.

With continued reference to FIGS. 1 to 3, the novel and improved molding apparatus 10 is stationarily arranged on a supporting surface 28 and will be seen to basically include stationary supporting means 30, carrying means 32, adjustable stop means 34, movable retaining means 36, and adjustable locking means 38.

In connection with stationary supporting means 30, such is intended to be secured rigidly in a manner to be presently described to supporting surface 28 and is defined by an elongated block 40 having opposed cut-outs 42. Cut-outs 42 cooperate with bolts 44, such as shown in FIGS. 1 and 2, for purposes of securely mounting stationary block 40 to supporting surface 28. Additionally, the stationary block is formed with a pair of threaded openings 46 which, in a manner to be described, cooperate with the retaining means 36. The stationary block also includes opening 48 with enlarged upper portions 50. It will be noted that a guidepost 52 is received in each of the openings 48. Such guideposts 52 serve to provide for the guided movement of the carrying means 34 in vertical directions. In addition, compression springs 54 are suitably disposed around guideposts 52 having one end thereof received within the enlarged upper portions 50. The opposite ends of the compression springs 54 abut the carrying means 32. By virtue of this particular arrangement, the springs 54 serve to provide a yielding force so that upon downward movement of the carrying means 32, greater resistance is encountered thereby, to slow its downward displacement. In this manner, the jewelry ring pattern 16 will not uncontrollably move downwardly so as to improperly form a cavity 12. In addition, the springs 54 function to automatically urge the carrying means 32 and master pattern 16 upwardly whenever the carrying means is permitted to move upwardly.

Supporting means 30 of this embodiment also includes center rod 56 which has at one end an upwardly threaded section and its opposite end secured in a corresponding opening 57 formed in stationary block 40. The center rod 56 is arranged to slidably cooperate with the carrying means 32. Additionally, a conventional type of manually adjustable positioning element 58 threadedly cooperates with the threaded portion of center rod 56, in a known manner, so as to enable the carrying means 32 to be retained in position.

By the foregoing constructional arrangement, carrying means 32 can be positively retained in position and, whenever displaced, such will be accomplished in a control manner. The particular significance of this particular attribute is to prevent uncontrolled upward or downward movement of master pattern 16.

As perhaps best shown in FIG. 1, stationary block 40 is formed with a continuous through passage 60 having a tapered wide mouth portion 62 and a restricted portion 64. Wide mouth portion 62, in conjunction with removably insertable plate 66, provides a compartment for the material 14 such that the ring portion 16 can impress therein initial cavity 12. In this particular embodiment, the portion 62 has a height which is of the type which will act to produce a cast jewelry slug member 17 having a corresponding height. While the upper wide mouth portion has a circular configuration and specific depth, other types and kinds of recesses can be formed within the spirit of this invention. The material 14 may be removed from the compartment by removing stationary block 40 from supporting surface 28 and inserting a suitable instrument through restricted portion 64. The foregoing assumes, of course, that retaining means 36 is not in its operative position over the material but is removed from over the surface of the material. It will, of course, be understood that other forms of removal of the material 14 are envisioned.

In regard to carrying means 32 of the instant invention, such is basically movably supported by supporting means 30 for movement of the master ring pattern 16 from between first and second positions. It being understood that, whenever the carrying means 32 is in the first position, such as illustrated by the phantom lines in FIG. 1, master ring pattern 16 is spaced away from the material in upper portion 62. Whenever the ring pattern 16 is in the second position, it serves to contact the material 14 to correspondingly form the initial cavity 12 therein. The carrying means 32 is defined by a generally rectangular block member 68 with a plurality of openings 72 extending vertically therethrough. The central opening 72 slidably receives center rod 56, whereas the outer pair of openings 72 slidably receive guideposts 52 which also permit sliding movement of carrying block 68. A threaded opening 74 is formed adjacent one end of the carrying block 68 which cooperates with the adjustable stop means 34 in a manner afterwards made evident and threaded opening 76 cooperates with locking means 38.

Specifically referring to the adjustable stop means 34, it will be noted that such is defined by a longitudinally threaded cap screw 78 which cooperates with a conventional retaining nut which is secured to carrying block 68. Through this form of arrangement, the cap screw 78 threadedly cooperates with opening 74 so as to be vertically positionable with respect to the carrying block 68. It will be noted that the forwardmost portion of cap screw 78 is designed to contact the top surface of stationary block 40. The foregoing is for purposes of positively limiting the downward movement of the carrying block 68 to its second position. Accordingly, the height by which various master patterns are able to penetrate the material 14 can be regulated.

Referring, in particular, to the adjustable locking means 38, it will be noted that it is defined by cap screw member 82 which has a threaded end threadedly cooperating with threaded opening 76. Also, the adjustable locking means 38 further includes a locking element 84. The locking element 84 is securely fitted on the shank of the adjustable screw 82 so as to be conjointly movable therewith. The locking element 84 has a generally hemispherical-shaped tapering wall 86. The tapering wall 86 is for purposes of contacting and pressing the ring shank 26 between it and a forward portion of the carrying block 68. While the present embodiment has disclosed a generally hemispherically-shaped locking element 84 securely mounted on a shank of adjustable screw 82, it is within the spirit and scope of the present invention that such locking element may have other configurations which can be used for firmly securing suitable and corresponding master patterns 16 and to the side of the carrying block 68. As a result of the preceding arrangement, the locking element 84 serves to prevent lateral displacement of the ring shank and thereby the master pattern setting 24.

As concerns the retaining means 36, such includes a pair of threaded bolts 88 which threadedly cooperate with threaded openings 46. Additionally, the retaining means includes a generally elongated retaining member 90 having generally elongated slot 92. The elongated member 90 has a forward end portion 94 which is adapted to make contact with the top of the ring setting 24, such as shown in FIGS. 1 to 3. Whenever in the illustrated position, the forward position 94 serves to prevent uncontrolled upward displacement of the ring setting 24 which further ensures that the cavity 12 is properly formed. The forward retaining portion 94 may be slidably removed rearwardly from the position as viewed in FIG. 1 through proper manipulation of bolts 88 such that the master pattern 16 can be appropriately removed from the material 14 whenever the carrying means 32 is to be raised to its upper or first position. This will occur after the master pattern 16 has formed the corresponding initial cavity 12.

Once the material 14 has been cured into the hardened body member 17, it can be used for purposes of casting the jewelry nest members 18 in the following manner.

Referring to FIG. 4A, there is shown a fragmentary view of conventional upper and lower mold plates 96 and 98, respectively. The lower mold member 98 has an appropriately formed recess 100 for purposes of removably receiving body member 17. As shown in FIG. 4A, the body member 17 is suitably received in recess 100 between the pair of separable molding plates 96 and 98. Such molding plates 96 and 98 may be comprised of conventional and traditional disc-like hard rubber molds, such as conventionally used in casting of jewelry. Therefore, a detailed description as to their normal configuration and mutual cooperation, since such is considered well within the knowledge of the art, has been dispensed with. Mention at this point should be made that the upper mold half 96, while being depicted in its vulcanized state, whereby it has surface 102 which is complementary to the configuration of nest cavity 12, the underneath side contacting the lower mold and cavity 12, is relatively flat in its unvulcanized state prior to the body member 17 being placed on the unvulcanized upper rubber disc. Accordingly, prior to the position of components shown in FIG. 4A, it will be understood that the body member 17 is first placed in a recess 100 such that the cavity 12 faces the unvulcanized surface of the upper mold 96. Alternately, the present invention envisions that the upper mold 96 could be contacted in any suitable manner, by the cavity 12 of body member 17 such that the cavity 12 engages the upper mold plate 96. Thereafter, of course, the mold plate 96 can be vulcanized such that cavity 12 forms a complementary surface 102 on the upper mold 96 for purposes presently mentioned.

After the vulcanization, it will be appreciated that the rubber material forming the upper mold half 96 is such that it conforms to the configuration provided by the cavity 12 in the body member. Consequently, the upper mold half is formed with a surface 102 which is complementary to the configuration of the desired cavity 20 to be formed in the nest member 18.

While the present invention has only depicted one body member 17 forming a single corresponding complementary surface 102 on a cooperating mold plate, it will be emphasized that such procedure can be repeated any number of times. In this particular fashion, it will be recognized that the single body member 17 having the cavity 12 can be used a plurality of times for making a corresponding number of complementary surfaces 102. As a result, a multitude of nest members 18 can be manufactured such that each has a cavity 20 which is identical to the others and importantly, of course, is complementary to the jewelry item which is to be received by the nest members.

From the position of components shown in FIG. 4A, the cured body member 17 is suitably stripped from the recess in lower mold plate 98 in a traditional manner. As mentioned, while a mold recess 100 has been disclosed, it will be appreciated that the lower mold plate 98 can be suitably formed with other configurations.

Specifically, referring now to FIG. 4B, such basically discloses the upper mold plate 96 with complementary surface 102 cooperating with lower mold plate 98 but with the addition of sprue hold 104 and gate lines 106 being conventionally formed in both upper and lower plates 96 and 98 so as to permit, in a well-known manner, casting of the nest member 18. Briefly described, the casting material 108 which is going to be used for the mold member 18 travels through the sprue, gate and finally to recess 100.

By virtue of the complementary configured surface 102, the cast material 108 for the nest member 18 will have a cavity 20 formed therein. As a consequence, the nest member 18 is formed with cavity 20 having a configuration which is complementary to that of the pattern 16 as well as, of course, the jewelry item which is intended to be snuggly received by the nest member 18.

By reason of the foregoing procedural steps, precisely formed cavities 20 are formed in the nest by virtue of the complementary surfaces 102 being precisely formed to the configuration of the jewelry item to be held which, in turn, is a result of the body member 17 having the cavity 12 formed so as to be complementary to the master pattern 16. The particular nest cavity 20 formed is especially advantageous in situations wherein the jewelry item is to be worked and non-movement of the jewelry item is desired, since the jewelry item is securely retained therein so that whatever mechanical operations might be performed, for the most part, will be insufficient to dislodge the same from the cavity. It will, of course, be appreciated that the nest member 18 and precisely formed cavity 20 serve to facilitate automatic manufacturing and assembly of jewelry items.

Referring to FIGS. 5 and 6, there is basically shown a releasable locking arrangement 110 for a nest member 112 which holds a jewelry item 114 for purposes of polishing or the like. In this particular embodiment, the nest member 112 is formed with a generally inverted dish-shape having peripheral edge 116 and cavity 118 which receives the jewelry item 114. The releasing arrangement 110 includes a base member 120 having a generally circular flange configuration with a plurality of threaded members 121 projecting therefrom which are circumferentially spaced.

Releasing arrangement 110 also includes upper locking member 122 having corresponding openings 124 formed therein for purposes of cooperating with the threaded members 121 in the manner shown in FIGS. 5 and 6 and later described. Openings 124 are formed with enlarged portion 124a, and lower lip portions 124b, which define a slot 126 for receiving threaded member 120. Upper locking member 122 is also formed with an overlapping segment 128 which cooperates with edge 116 in the usual manner. To quickly unfasten and replace the nest member 112, one merely has to rotate the upper housing member 122 relative to the lower housing member 120 such that the threaded members 121 cooperate with the enlarged openings 124a. In this position, the upper member 122 may be easily axially separated from the lower or base member 120. As a result, the nest member 112 can be easily removed. The above constructional arrangement for locking arrangement 110 is particularly suitable in conventional types of jewelry polishing arrangements. The foregoing description, however, was for purposes of illustrating different types of nest configurations which are possible within the spirit and scope of the present invention and, also, their application in certain situations.

As is believed readily apparent from the foregoing description of the present invention, such provides for the production of jewelry nest members, whereby the cavity of each serves to receive a jewelry item in a manner such that the jewelry item is snuggly retained therein and restrained against unintended and controlled dislodgment.

In addition, this invention enables the formation of a multitude of nest members, each having identical and precisely formed cavities, with the production of a single nest plug member, which may be suitably applied to unvulcanized rubber discs so that, after vulcanization, a plurality of complementary surfaces, such as 102 illustrated in FIGS. 4A and 4B, can be formed. As a result of this formation, it will be understood that a simple and continuous, yet efficient and economical, process is provided for manufacturing jewelry type nests with heretofore unobtainable preciseness. While the foregoing description is directed to the information of nests for jewelry items, such as rings, it is well within the spirit and scope of the present invention that other types of work holding devices can be suitably formed.

While the invention has been described in connection with preferred embodiments, it is to be understood that it is not intended to limit this invention to the particular forms set forth above, but, on the contrary, it is intended to cover such alternatives, modifications, and equivalents as may be included within the spirit and scope of the invention as defined by the appended claims.

What is claimed is:

1. A method for use in forming a nest member having a nest cavity adapted to snugly yet removably receive a jewelry article or the like, comprising:
    (a) impressing a master pattern having a raised configuration in a body to form an impression, said body comprised of a material before curing having a softness factor so that said impression, while complementary to, corresponds substantially identically in contour with that of said master pattern;
    (b) curing said body to acquire a hardness sufficient for retention of said impression;
    (c) forming a layer of vulcanizable material into a mold member having a configuration complementary to contours of said body by engaging said layer with said body;
    (d) vulcanizing at least said mold member so that said surface attains a contour substantially complementary to that of said impression in said body; and,
    (e) casting said nest member in a mold comprising said vulcanized mole member and a second mold member whereby said nest cavity having the desired configuration is precisely formed therein.

2. The method of claim 1 wherein the steps (a) through (e) are repeated in sequence to form a plurality of nest members.

3. The method of claim 1 wherein a plurality of impressions are created in said body at spaced locations and the steps (b) through (e) are repeated in sequence to form a plurality of nest members.

* * * * *

UNITED STATES PATENT AND TRADEMARK OFFICE
CERTIFICATE OF CORRECTION

PATENT NO. : 4,153,662
DATED : May 8, 1979
INVENTOR(S) : Theodore Descovich, Louis F. Donadio and Anthony F. Cecere It is certified that error appears in the above-identified patent and that said Letters Patent are hereby corrected as shown below:

Column 5, line 55, "and" should be omitted (second occurrence)

Column 8, line 25, "information" should be --formation--

Claim 1, sub-paragraph (e) (Column 8, line 56), "mole" should be --mold--.

Signed and Sealed this

Sixteenth Day of October 1979

[SEAL]

Attest:

RUTH C. MASON
Attesting Officer

LUTRELLE F. PARKER
Acting Commissioner of Patents and Trademarks